United States Patent
Kurokawa

(10) Patent No.: US 10,428,857 B2
(45) Date of Patent: Oct. 1, 2019

(54) CLIP WITH GROMMET AND PIN

(71) Applicant: NIFCO INC., Yokosuka-shi, Kanagawa (JP)

(72) Inventor: Takuya Kurokawa, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 93 days.

(21) Appl. No.: 15/558,463

(22) PCT Filed: Mar. 7, 2016

(86) PCT No.: PCT/JP2016/056922
§ 371 (c)(1),
(2) Date: Sep. 14, 2017

(87) PCT Pub. No.: WO2016/147922
PCT Pub. Date: Sep. 22, 2016

(65) Prior Publication Data
US 2018/0066694 A1 Mar. 8, 2018

(30) Foreign Application Priority Data
Mar. 16, 2015 (JP) .................... 2015-051555

(51) Int. Cl.
*F16B 21/04* (2006.01)
*F16B 19/10* (2006.01)
(Continued)

(52) U.S. Cl.
CPC .............. *F16B 19/10* (2013.01); *F16B 21/02* (2013.01); *F16B 21/04* (2013.01); *F16B 21/086* (2013.01); *F16J 15/10* (2013.01); *F16J 15/104* (2013.01)

(58) Field of Classification Search
CPC ......... F16B 43/001; F16B 21/02; F16B 21/04
(Continued)

(56) References Cited

U.S. PATENT DOCUMENTS 2,858,156 A * 10/1958 Wootton .................. B64C 1/14
24/2
2,940,558 A * 6/1960 Schlueter .................. F16B 5/10
248/222.52
(Continued)

FOREIGN PATENT DOCUMENTS

CN 2809305 Y 8/2006
CN 102803757 A 11/2012
(Continued)

OTHER PUBLICATIONS

PCT/ISA/210, "International Search Report for International Application No. PCT/JP2016/056922", dated Mar. 29, 2016.
(Continued)

*Primary Examiner* — Flemming Saether
(74) *Attorney, Agent, or Firm* — Manabu Kanesaka

(57) ABSTRACT

This clip is used for, for example, attaching and constraining one member to the other member in a detachable manner, and is provided with a head disposed so as to block off a through hole of one of the members among through holes formed through the two members, and a leg which is inserted in the through hole, and which engages the back side of the other member. The clip is at least provided with a first member having a head, a suction part protruding from the circumference of the head, and an insertion hole in the axial direction, and a second member having a head overlaid so as to have a watertight structure with the head of the first member, and the leg formed perpendicularly with respect to the head, and inserted in the insertion hole.

5 Claims, 10 Drawing Sheets

(51) Int. Cl.
*F16B 21/02* (2006.01)
*F16J 15/10* (2006.01)
*F16B 21/08* (2006.01)

(58) Field of Classification Search
USPC .................. 411/349, 549, 553, 369, 371.1
See application file for complete search history.

(56) References Cited

U.S. PATENT DOCUMENTS

| | | | | |
|---|---|---|---|---|
| 3,168,321 | A * | 2/1965 | Glicksman | F16B 43/001 |
| | | | | 277/637 |
| 5,846,040 | A | 12/1998 | Ueno | |
| 7,862,275 | B2 * | 1/2011 | Jatzke | B60R 13/0206 |
| | | | | 411/45 |
| 7,955,038 | B2 * | 6/2011 | Silbereisen | F16B 19/008 |
| | | | | 24/663 |
| 8,475,103 | B2 * | 7/2013 | Michalski | F16B 43/001 |
| | | | | 411/369 |
| 8,545,155 | B2 * | 10/2013 | Giraud | F16B 21/02 |
| | | | | 411/371.2 |
| 9,068,584 | B2 * | 6/2015 | McDowell | F16B 19/008 |
| 10,184,503 | B2 * | 1/2019 | Mori | B62D 27/02 |
| 2009/0290932 | A1 | 11/2009 | Silbereisen et al. | |
| 2011/0000056 | A1 | 1/2011 | Iwahara et al. | |
| 2012/0124792 | A1 | 5/2012 | Ooki | |
| 2012/0261942 | A1 | 10/2012 | Benedetti | |
| 2018/0347618 | A1 * | 12/2018 | Zander | F16B 43/001 |

FOREIGN PATENT DOCUMENTS

| | | |
|---|---|---|
| JP | H08-014231 A | 1/1996 |
| JP | H08-177284 A | 7/1996 |
| JP | 2004-278731 A | 10/2004 |
| JP | 2005-76694 A | 3/2005 |
| JP | 2009-144765 A | 7/2009 |
| JP | 2009-535584 A | 10/2009 |
| JP | 4621808 B1 | 1/2011 |
| JP | 2011-089538 A | 5/2011 |
| JP | 2014-020466 A | 2/2014 |
| WO | 2011/049096 A1 | 4/2011 |

OTHER PUBLICATIONS

PCT/ISA/237, "Written Opinion of the International Searching Authority for International Application No. PCT/JP2016/056922", dated Mar. 29, 2016.
China Patent Office, "Office Action for Chinese Patent Application No. 201680016075.6," dated Oct. 12, 2018.
Europe Patent Office, "Search Report for European Patent Application No. 16764752.8," dated Oct. 22, 2018.
China Patent Office, "Office Action for Chinese Patent Application No. 201680016075.6," dated Jun. 25, 2019.

* cited by examiner

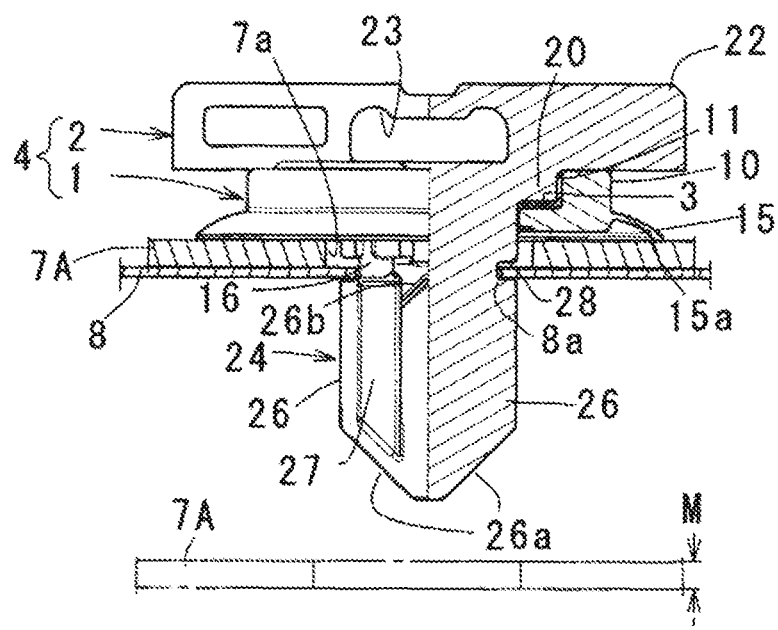

CLIP WITH GROMMET AND PIN

TECHNICAL FIELD

The present invention relates to a clip that is particularly suitable for removably attaching the other member to one member.

BACKGROUND ART

There is a clip which is used for removably attaching or restraining one member with respect to the other member and which includes a head part disposed to close a through-hole of the one member among through-holes formed in both members and a leg part inserted into the through-holes and engaged with the other member side. As an example, FIG. 10 shows a clip disclosed in Patent Document 1. FIG. 10A is a perspective view of the clip alone, and FIG. 10B is a sectional view showing the clip together with a molding die. This clip 10 is a resin molded body and includes an anchor 12, a connection part 14 and a dish part 16. The anchor 12 corresponds to the leg part of the present invention, and the connection part 14 and the dish part 16 correspond to the head part of the present invention. The dish part 16 corresponds to the suction part of the present invention and has a seal surface 18A to be pressed against member surfaces. In this structure, in the case of forming the dish part 16 having the seal surface 18A, i.e., the dish-like suction part, a mold parting line occurs in the seal surface of the suction part in the normal mold separation of the molding die. That is, a radial step or scratch occurs in the trace of the mold matching part of the die and the pulled-out trace of a slide mold. Thus, there is a possibility that the water stoppage or watertightness may be hindered. The present invention solves this problem by devising the molding die.

That is, this structure is characterized in that the anchor 12 and the dish part 18 are molded by a mold made of an upper mold 42 and a plurality of lower molds 43, which are opened along an axis of the anchor, and a plurality of slide molds 44 for molding the interior of the anchor 12, as shown in FIG. 10B, and in that the seal surface 18A of the dish part is molded by a continuous mold surface in a circumferential direction of a single mold.

CITATION LIST

Patent Document

Patent Document 1: Japanese Patent Publication No. 4621808

SUMMARY

In the above structure, the seal surface of the suction part can be molded by the continuous mold surface in the circumferential direction of the single mold, and thus, the mold parting line does not occur, thereby making it possible to maintain good watertightness. However, such measures cause the mold structure and its drive control to be complicated, and cause a limitation on the increase of a molding speed. Accordingly, the manufacturing cost increases, and maintenance or the like becomes complicated due to the complicated mold structure.

The present invention has been made to solve the above problems and an object thereof is to obtain a clip excellent, particularly, in watertightness while allowing a simple mold structure to be adopted as a molding die. Other objects will be clarified in the following description.

In order to achieve the above object, the feature of the invention is specified as follows, with reference to FIGS. 1 to 7.

(1) A clip used for removably attaching or restraining one member (7) with respect to the other member (8) includes a head part disposed to close a through-hole of the one member among through-holes (7a, 8b) formed in the both members and a leg part inserted into the through-holes and engaged with the back side of the other member. The clip (4) includes, at least, a first member (1) that has the head part (10), a suction part (15) protruding around the head part and an axial insertion hole (13), and a second member (2) that has a head part (20) overlapping with the head part of the first member and forming a watertight structure therebetween and a leg part (24) vertically provided from the head part and inserted into the insertion hole.

In the present invention as described above, "one member" and "the other member" may have any relationship, such as that one member is restrained, attached, connected or locked to the other member. Further, the one member and the other member may be configured by a single part or a plurality of parts. As a specific example, the one member is, for example, a member such as a seal plate attached to the other member. The other member is, for example, a member such as a body or panel of a vehicle.

It is more preferable that the present invention as described above is embodiment as specified in the following (2) to (6).

(2) The watertight structure has a packing (3) disposed between the head part (10) of the first member and the head part (20) of the second member.

(3) The watertight structure has an annular elastic wall portion (5) which is provided in one of the first member and the second member and is abutted against the opposing surface of the other thereof, as illustrated in FIG. 9.

(4) The leg part (24) is shaped to have a direction in which it can be inserted into a non-circular hole as the through-hole and a direction in which it cannot be inserted into the non-circular hole, and the leg part has a plurality of side walls (25) which is pressed against a hole edge or hole wall of the through-hole by being pivoted in a state of being inserted into the through-hole.

(5) The side walls (26) are separated from an upper wall by a lateral groove (28) and has an inclined portion (26b) which is formed in a thickness direction and faces an end surface of the upper wall with the lateral groove interposed therebetween, and a hole edge side (which is the same as hole periphery) of the through-hole (8a) is clamped between the uppermost portion of the inclined portion (26b) and the end surface of the upper wall when the leg part (24) is pivoted in a state of being inserted into the through-hole.

(6) The leg part (24) has a temporary fixing claw portion (29) which contracts in diameter when inserted into the through-hole and elastically restores after the passing through the through-hole to be engaged with the hole edge of the through-hole.

(7) The first member (1) has a plurality of pieces (16) which is provided on its back surface and has a wide portion (17) on the base end side and a narrow portion (18) on the leading end side, and the narrow portion (18) can be brought into contact with the corresponding portion of the through-hole at the time of main fixing after the pivoting.

In the invention of the above (1), the head part with the suction part and the leg part for member attachment are separately formed into at least two members such as the first member and the second member. Therefore, the mold including the molding part that is difficult to be molded as the mold configuration for resin molding is easy to manufacture. Especially, this allows the suction part, i.e., the seal surface of the suction part to be formed by the two-sided split mold structure without putting a parting line therein, thereby making it possible to maintain good watertightness.

In the invention of the above (2), the watertightness from the side of the leg part is secured by the packing, as a watertight structure, disposed between the head part of the first member and the head part of the second member. Further, it is possible to easily absorb the variations in the plate thickness dimension or the like while properly setting the degree of the pressure contact of the suction part and the degree of the engagement of the leg part by the collapse of the packing.

In the invention of the above (3), the watertightness from the side of the leg part is secured by the elastic wall portion, as a watertight structure, which is provided in one of both members and is abutted against the opposing surface of the other thereof. Further, it is possible to easily absorb the variations in the plate thickness dimension or the like while properly setting the degree of the pressure contact of the suction part and the degree of the engagement of the leg part by the elastic displacement of the elastic wall portion.

In the invention of the above (4), as illustrated in the embodiment, the clip is a turn fastener type in which the clip is shaped to have a direction in which it can be inserted into the non-circular hole as the through-hole of the other member and a direction in which it cannot be inserted into the non-circular hole, and in which the detachment of the clip is prevented by being pivoted in a state where it is inserted into the through-hole. Particularly, this type can suppress a high withdrawal force after the clip fastening and the displacement of the leg part at the time of withdrawal. Therefore, this clip is suitable for the case where the detection accuracy of a pressure sensor or the like for actuating an airbag of an automobile is easily influenced by the displacement of the leg part of the clip when a high load is applied in the clip fastening state.

In the invention of the above (5), in the case of the turn fastener type clip, when the second member is pivoted in a state in which the leg part is inserted into the through-hole of each member, the inclined portion of each side wall passes through the through-hole while being pressed against the inner surface of the through-hole and clamps the hole edge side of the through-hole of the other member between the end surface of the upper wall and the uppermost portion of the inclined portion. In this configuration, for example, there are advantages that the inclined portion can function as a screwing action to reduce the pivoting resistance during the pivoting operation and that it can be seen by the click feeling that the hole edge of the through-hole is completely clamped or engaged between the end surface of the upper wall and the uppermost portion of the inclined portion.

In the invention of the above (6), in the case of the turn fastener type clip, even before the clip is pivoted to the main fixation state, the clip is temporarily fixed to the through-hole of the other member by the claw portion and is not inadvertently detached, so that its usability is good.

In the invention of the above (7), in the case of the turn fastener type clip, when the clip is pivoted to the main fixation state, the narrow portion on the leading end side of the piece contacts the through-hole of the other member, i.e., the non-circular hole so as to fill the gap. In this way, rattling or the like is eliminated and a stable fixation state can be obtained.

BRIEF DESCRIPTION OF DRAWINGS

FIG. 1A is a front view, FIG. 1B is a right side view, and FIG. 1C is a bottom view.

shows FIG. 2A is a plan view, FIG. 2B is a sectional view taken along the line A-A in FIG. 2A, and FIG. 2C is a bottom view.

FIG. 3A is a plan view, FIG. 3B is a half sectional view taken along the line B-B in FIG. 3A, and FIG. 3C is a bottom view.

FIG. 4 is a half sectional view of the same main fixation state as FIG. 3B, showing the case where a thickness M of the one member is thicker than that in the above embodiment.

FIG. 5A is a plan view, FIG. 5B is a half sectional view taken along the line C-C in FIG. 5A, and FIG. 5C is a bottom view.

FIG. 6A is a view showing a cavity of a suction part forming portion of a molding die, FIG. 6B is a view showing a state in which the cavity is filled with a resin, FIG. 6C is a perspective view of the grommet taken out from the die, as viewed from below.

FIG. 7A is a front view, FIG. 7B is a right side view, and FIG. 7C is a bottom view.

FIG. 10A is FIG. 1 of the Document 1, and FIG. 10B is FIG. 6 of Document 1.

DESCRIPTION OF ILLUSTRATIVE EMBODIMENTS

Figure 1A:
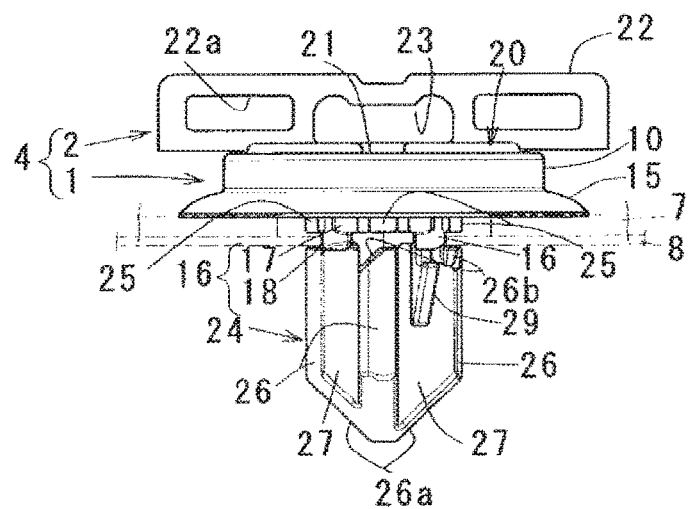
FIGS. 1A to 1C show a clip according to an embodiment of the present invention.

Hereinafter, embodiments of the present invention and modifications thereof will be described with reference to the drawings. In this explanation, a structure of a clip is described in detail, and then, the assembly and main operation is clarified, and finally, a modification shown in FIG. 9 will be mentioned.

(Structure)

A clip 4 of the present embodiment is used for removably attaching one member 7 that is a member such as a seal plate to the other member 8 such as a body or a panel. The clip 4 includes a head part 10 disposed to close a through-hole 7a formed in the one member 7 among through-holes 7a, 8a formed in the one member 7 and the other member 8, and a leg part 24 inserted into the through-holes 7a, 8a and engaged with the back side of the other member 8. That is, this clip 4 includes a grommet 1 as a first member, a pin 2 as a second member, and a packing 3. The grommet 1 has the head part 10, a suction part 15 protruding around the head part 10, and an insertion hole 13 for the leg part. The pin 2 has a head part 20 overlapping with the head part 10 of the grommet and forming a watertight structure therebetween, and the leg part 24 vertically provided from the head part 20. The packing 3 is disposed between the head part 10 and the head part 20.

Figure 2A:
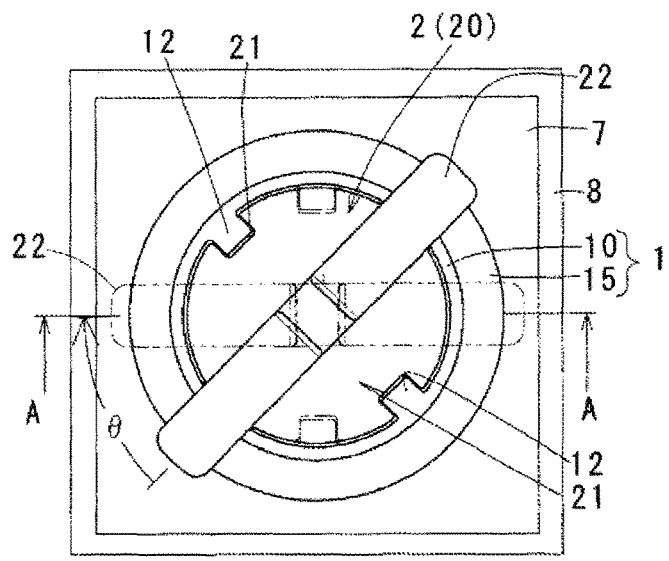
FIGS. 2A to 2C show a state in which the clip is inserted into through-holes and temporarily fixed in an operation of attaching one member to the other member by using the clip.
Figure 2B:
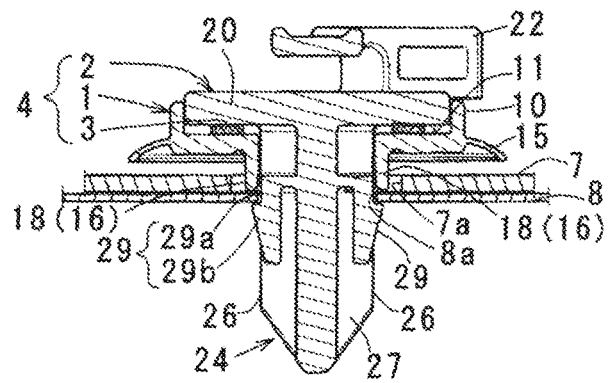
Figure 2C:
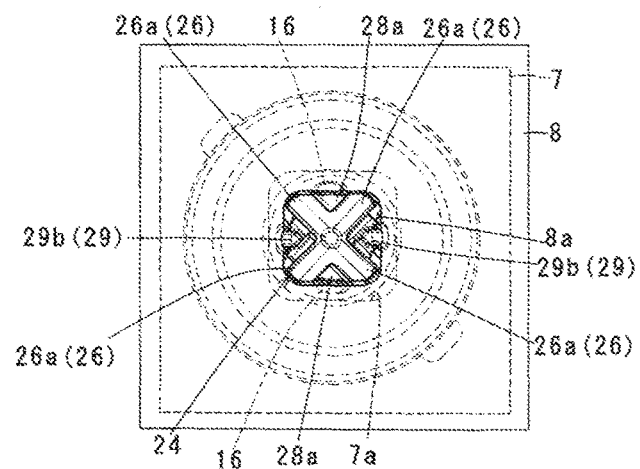
Figure 3A:
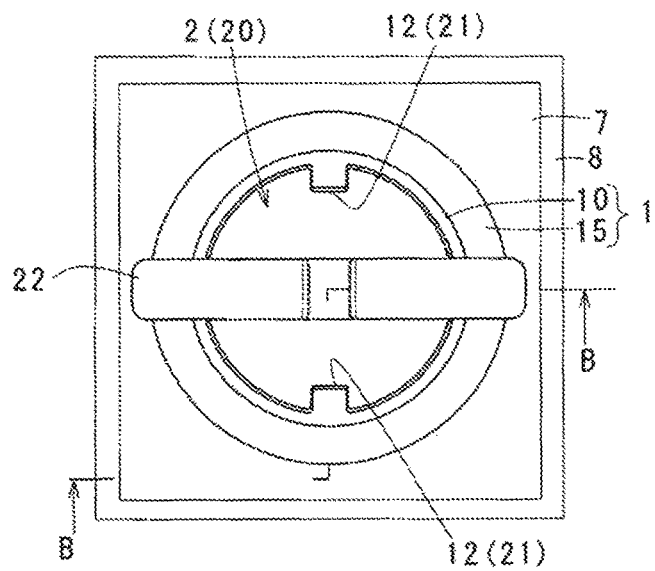
FIGS. 3A to 3C show a main fixation state in which one member is attached to the other member by using the clip.
Figure 3B:
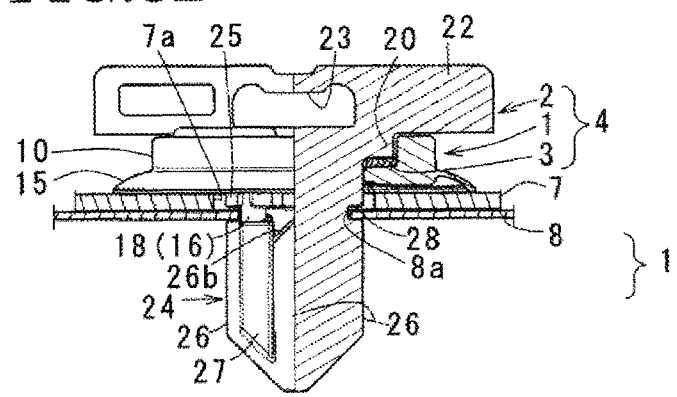
Figure 3C:
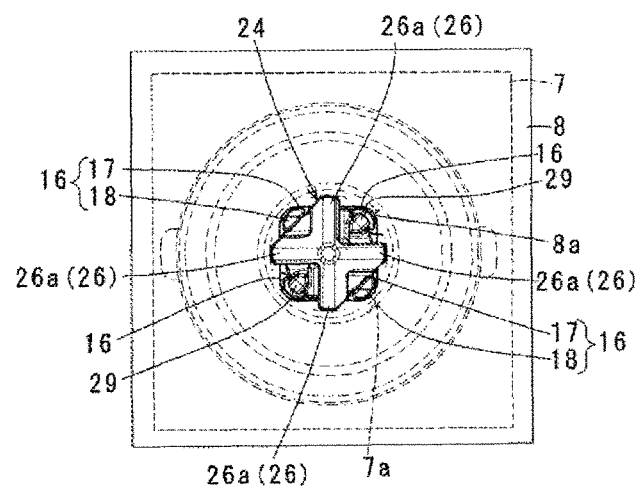

Meanwhile, as shown in FIGS. 2C and 3C, the through-hole 8a having a rectangular shape is formed in the other member 8. The through-hole 8a has a diagonal line longer than a distance between opposite sides. The through-hole 8a may be at least a non-circular hole. The through-hole 8a is set to a shape having a direction in which the leg part 24 can be inserted into the non-circular hole and a direction in which the leg part 24 cannot be inserted into the non-circular hole. On the contrary, the through-hole 7a arranged coaxially with respect to the through-hole 8a is formed in the one member 7. This through-hole 7a is preferably formed in a hole shape slightly larger than the through-hole 8a.

Figure 5A:
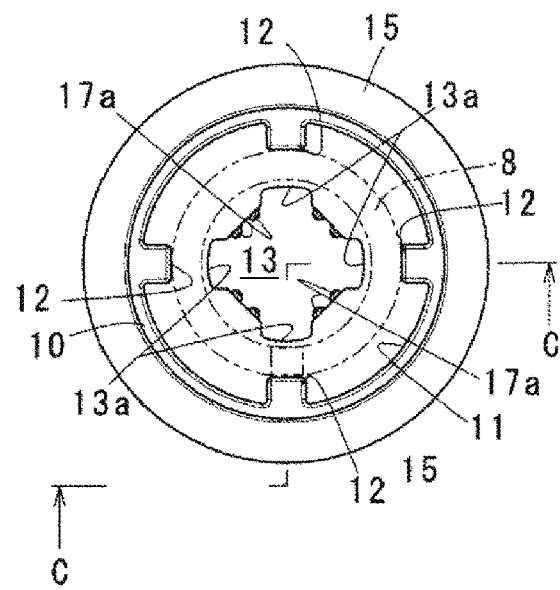
FIGS. 5A to 5C show a grommet constituting the clip.
Figure 5B:
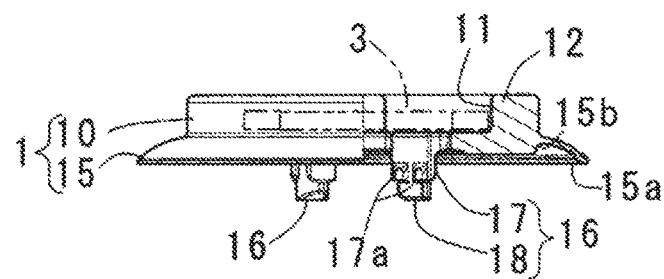
Figure 5C:
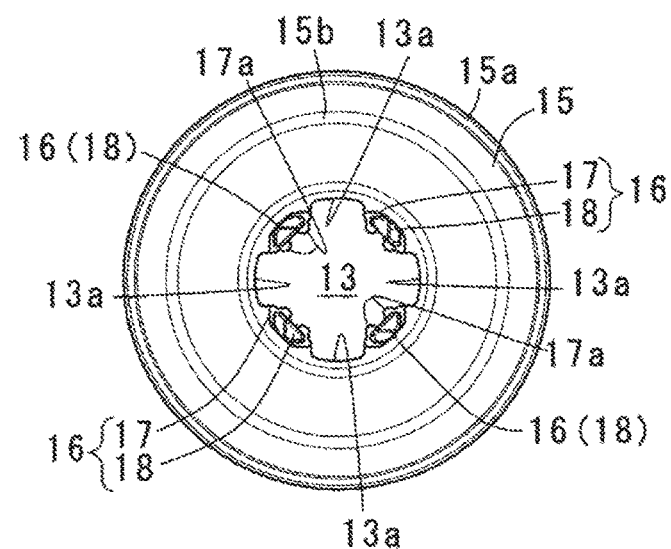

Here, as shown in FIGS. 5 and 6, the grommet 1 is an injection-molded resin molded body. The head part 10 has a substantially doughnut shape and has a circular recessed portion 11 formed on the upper side, a plurality of (four in this example) engaging convex portions 12 provided at places equally dividing the circumference on the inner periphery of the recessed portion 11, and the insertion hole 13 penetrating in an axial direction at the center of the recessed portion 11. The insertion hole 13 has a substantially cross shape as a whole and has corner hole portions 13a obtained by cutting four corner portions of a rectangular main hole portion.

A plurality of (four in this example) pieces 16 protruding downward from places equally dividing the circumference of the insertion hole 13 is provided on a lower surface of the head part 10. That is, each of the pieces 16 is provided between adjacent corner hole portions 13a at a hole edge of the insertion hole 13 and has a wide portion 17 of a wide width on the base side and a narrow portion 18 of a narrow width on the leading side. Paired ribs 17a are provided in front of the narrow portion 18 on the inner surface of the wide portion 17.

The suction part 15 protrudes in a form of an umbrella or dish from the lower circumference of the head part 10, and the inner surface side thereof is formed as a seal surface 15a in contact with the surface of the one member 7. This seal surface 15a is formed so that a parting line does not enter therein (as described later). Therefore, the seal surface 15a is smooth and excellent in watertightness. A reference numeral 15b indicates an inner surface portion on the base portion side of the suction part 15.

In the above grommet 1, the head part 10 and the suction part 15 are molded by two-sided split upper and lower molds 9A, 9B as a mold structure as shown in FIG. 6. In other words, in this mold structure, at least the seal surface 15a of the suction part 15 is molded by a continuous mold surface in a circumferential direction of the single lower mold 9B. The upper and lower molds 9A, 9B are set at places where a parting line PL avoids the seal surface 15a of the suction part 15.

Figure 6A:
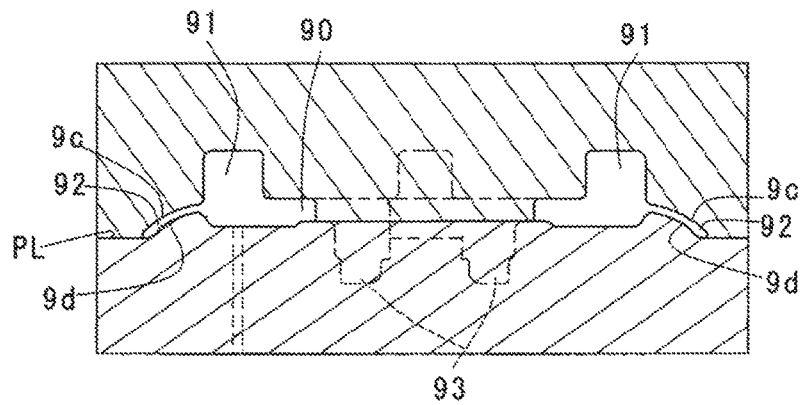
FIGS. 6A to 6C are a schematic view for explaining a resin molding method of the grommet.
Figure 6B:
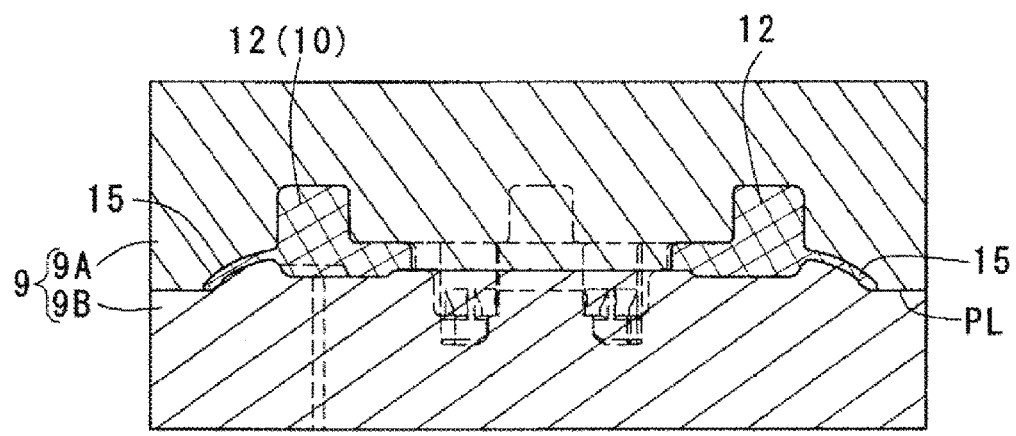

In FIG. 6A, a reference numeral 90 indicates a cavity forming an inner flat portion of the head part 10, a reference numeral 91 indicates a cavity forming an outer flat portion and the convex portion 12 of the head part 10, and a reference numeral 92 indicates a cavity forming the suction part 15. The cavity 92 is defined between an upper mold portion 9c and a lower mold portion 9d. The cavity 93 is a cavity forming the pieces 16. FIG. 6B shows a state in which molten resin is filled in the cavities 90 to 93 from an injection molding machine (not shown).

Figure 1B:
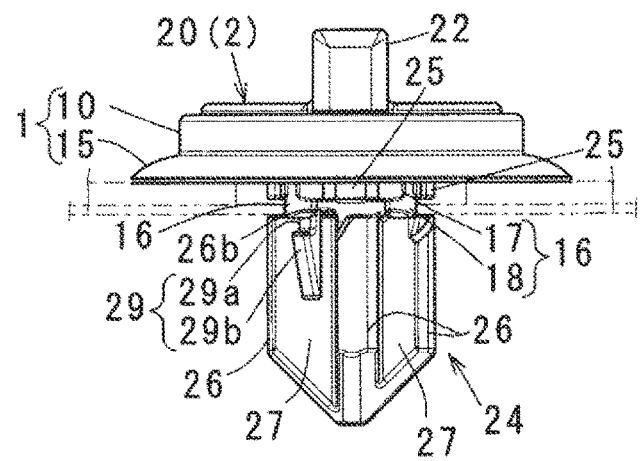
Figure 1C:
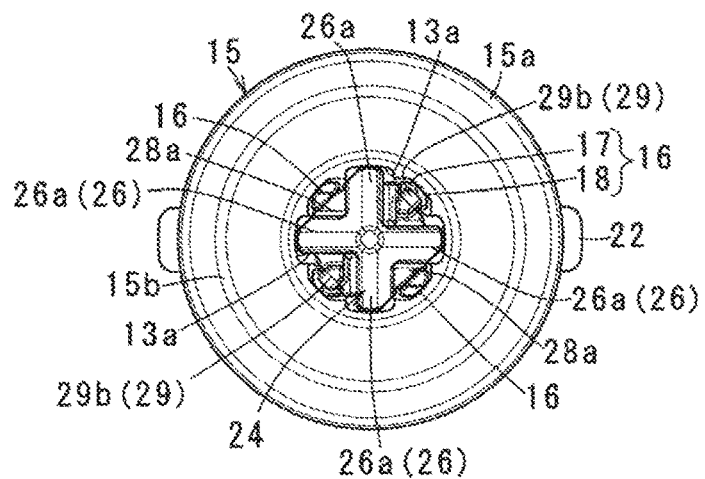
Figure 6C:
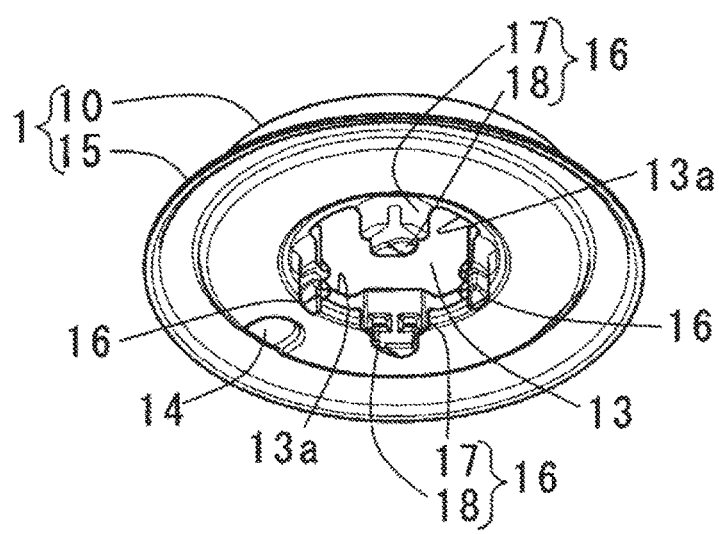
Figure 7A:
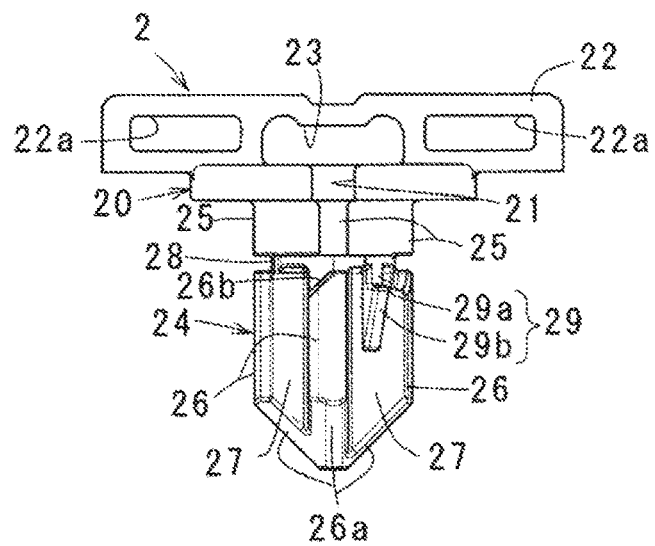
FIGS. 7A to 7C show a pin.
Figure 7B:
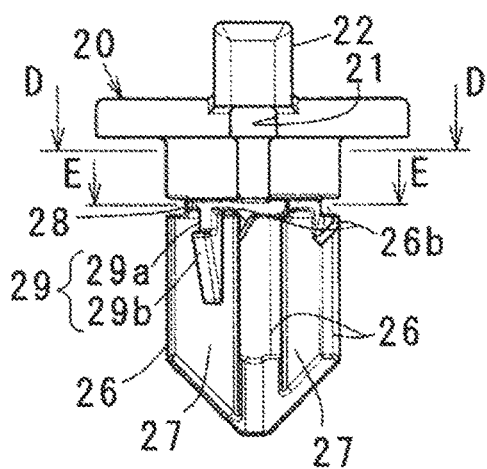
Figure 7C:
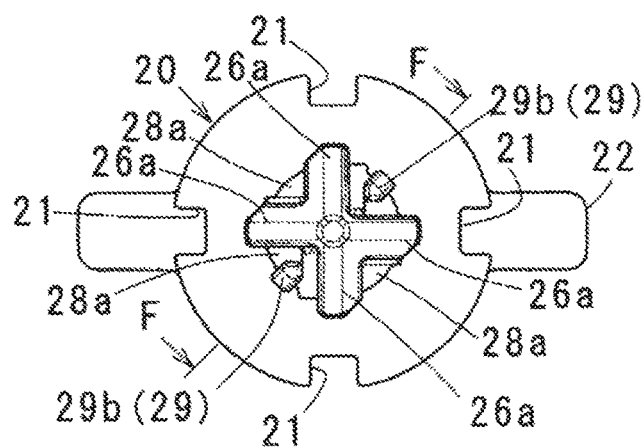
Figure 8A:
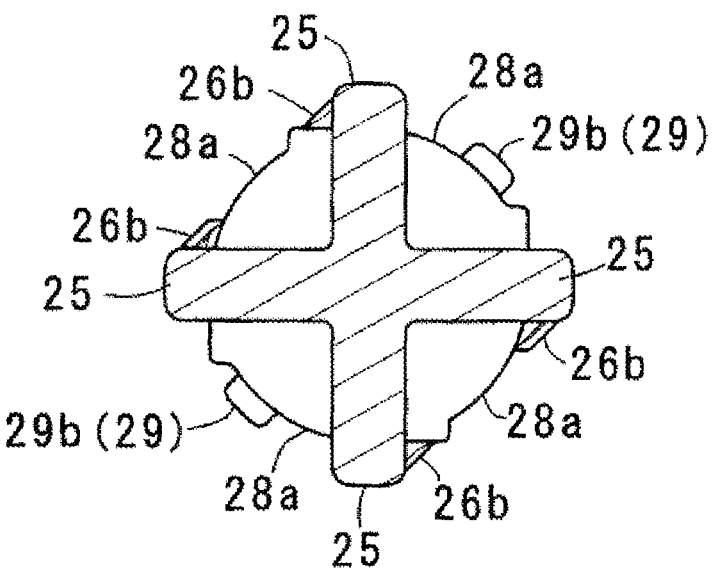
FIGS. 8A and 8B are sectional views taken along the line D-D and the line E-E in FIG. 7B.
Figure 8B:
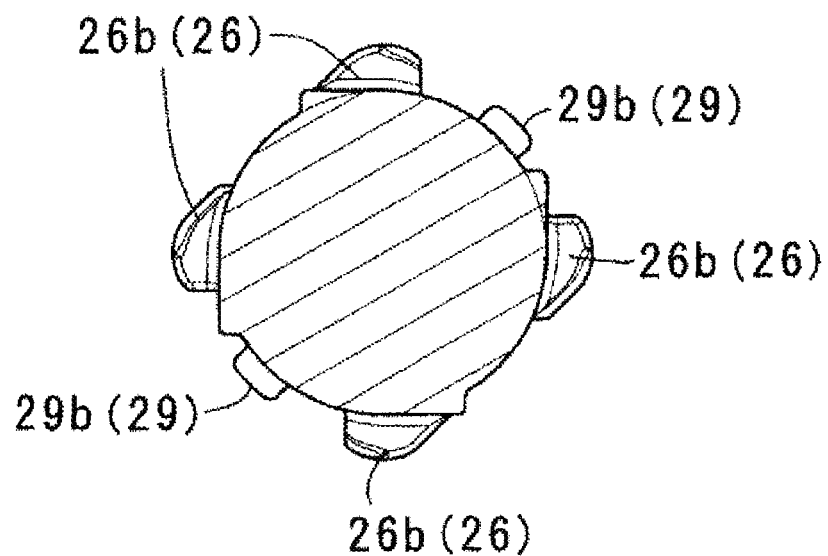
Figure 8C:
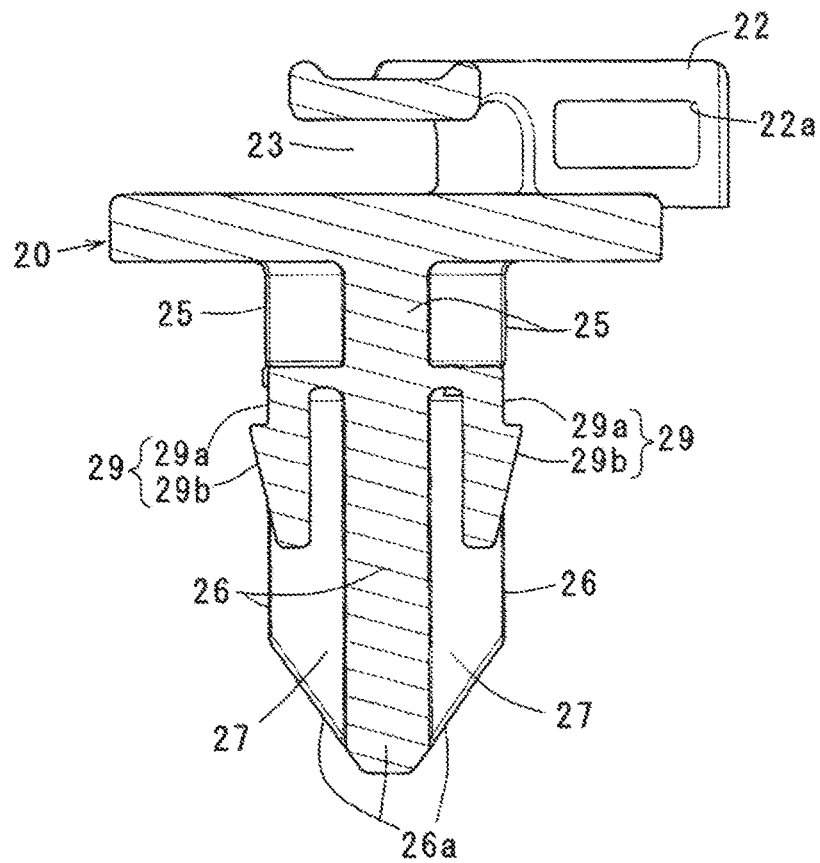
FIG. 8C is an enlarged sectional view taken along the line F-F in FIG. 7C.

FIG. 6C is a schematic view showing the injection-molded grommet released. Since the seal surface 15a of the suction part 15 molded by the above mold 9 is formed by the single lower mold portion 9d, the seal surface 15a is smooth and excellent in watertightness. A reference numeral 14 indicates a gate position that is a resin injection portion. This gate position 14 is also set to a position avoiding at least the seal surface 15a. Meanwhile, the gate position 14 is omitted in FIGS. 1 and 5.

On the other hand, the pin 2 is a resin molded body injection-molded by a plurality of upper and lower molds and a slide mold as a mold structure. In this form, the seal surface 5a is set at the grommet 1. Therefore, the pin 2 has no seal surface, and thus, the degree of freedom as the mold is increased. The head part 20 of the pin 2 has a disc shape that is sized to be fitted into the recessed portion 11 of the head part 10. The head part 20 has a plurality of concave portions 21 formed in the periphery thereof and engageable with the convex portions 12, and a knob part 22 provided on the upper surface thereof.

The concave portions 21 are provided in the same number as the convex portions 12. The knob part 22 extends in the diameter direction of the upper surface of the head part 20 and protrudes to both sides of the head part. An operator can grasp the knob part 22 by hand to pivot the pin 2, i.e., the pin connected to the grommet 1. Further, in the knob part 22, a cavity 23 is formed penetratingly in a horizontal direction near the middle of the right and left. This cavity 23 contributes to weight reduction by the underfill, and is used, for example, when inserting a tool such as a screwdriver into the cavity to forcibly pull the pin 2 from the grommet 1.

The leg part 24 protrudes near the center of the lower surface of the head part 20 and has a substantially cross shape whose horizontal section corresponds to the insertion hole 13 of the grommet. The leg part 24 is composed of four side walls 26. Each side wall 26 is separated from an upper wall 25 by a lateral groove 28 provided on the upper side. Each side wall 26 is formed slightly thicker than the upper wall 25. Further, a lower end side of each side wall 26 is formed in a tapered portion 26a approaching an axis as it goes downward, and an upper end side thereof is formed in an inclined portion 26b facing a lower end surface of the upper wall 26 with the lateral groove 28 interposed therebetween.

The tapered portion 26a facilitates insertion when the leg part 24 is inserted and connected to the insertion hole 13 of the grommet or when the leg part 24 is inserted into the through-holes 7a, 8a to attach the one member 7 to the other member 8. The inclined portion 26b is formed to have a predetermined gradient between the lowermost portion where one side (one side in the thickness direction) is located downward from the lateral groove 28 by a predetermined distance and the uppermost portion where the other side (the other side in the thickness direction) communicates with the lateral groove 28.

Corner spaces 27 whose sections are substantially perpendicular to each other are provided between the side walls 25 and between the side walls 26. The corner spaces 27 are formed at four places. Each of the corner spaces 27 is provided with a small flange portion 28a provided so as to connect adjacent lateral grooves 28 and a temporary fixing claw portion 29 protruding downward from peripheral surfaces of two opposing flange portions 28a.

Each flange portion 28a is approximately formed in an arc shape of connecting the bottom surfaces of the lateral grooves 28 around the axis of the leg part 24. The claw portion 29 has a base portion 29a connected to the flange portion 28a, and a claw 29b which is formed at a leading end of the base portion 29a and whose upper end surface is hooked. The above claw portion 29 contracts in diameter when the leg part 24 is inserted into the through-hole 8a, and elastically restores after the passing of the leg part 24 through the through-hole 8*a* and engages with the hole edge of the through-hole 8*a*, thereby temporarily fixing the clip 4 before the main fixation, i.e., until the pivot operation is performed.

(Assembly)

The above pin 2 is integrally assembled, together with the packing 3, to the grommet 1. In this assembling operation, first, the packing 3 is placed in the recessed portion 11 of the head part of the grommet. The packing 3 is formed of rubber, soft resin or the like. As inferred from FIG. 2B, the packing 3 has a disc shape disposed in the recessed portion 11 and has a hole portion in the center portion, through which the leg part 24 can be inserted with a margin.

Subsequently, the pin 2 is connected to the grommet 1. In this operation, in the state where the cross-shaped side walls 25 (25, 26) constituting the leg part 24 are aligned with the corner hole portions 13*a* of the insertion hole 13 on the side of the grommet 1, the pin 2 is pressed toward the grommet 1. Then, in the pin 2, the claw portion 29 is abutted against the hole portion of the insertion hole 13 connecting the corner hole portion 13*a* and the corner hole portion 13*a* while the leg part 24 is inserted through the insertion hole 13. When the pin 2 is further strongly pressed, the claw 29*b* constituting the claw portion 29 contracts in diameter with the base portion 29*a* as a fulcrum and passes through the insertion hole 13. When the claw 29*b* completely passes through the insertion hole 13, the claw portion 29 elastically restores to its original state.

Simultaneously, since the head part 20 is engaged with the recessed portion 11 of the head part 10 with the engagement of the convex portion 12 and the concave portion 21, the pivoting of the pin 2 alone is restricted with respect to the grommet 1. Further, in the pin 2, each of the flange portions 28*a* is abutted against the inner surface of the corresponding piece 16, passes through the rib 17*a* of the wide portion with the elastic diametrical expansion of the piece 16, and is engaged with the narrow portion 18. The withdrawal of the pin 2 from the grommet 1 is restricted by the engagement of the flange portion 28*a* and the narrow portion 18. As a result, the pin 2 and the grommet 1 are connected to each other to form an integral clip 4.

(Operation)

For example, as shown in FIGS. 2 to 4, the above clip 4 is used for removably attaching the one member 7 to the other member 8. Hereinafter, the main operation features in that case will be described. Meanwhile, in this example, the through-hole 8*a* is a rectangular hole, and the shape of the through-hole 7*a* is not particularly limited.

(A) In the attachment operation, the one member 7 is positioned with respect to the other member 8 so that the through-holes 7*a*, 8*a* overlap with each other. From the state where the one member 7 is positioned, the clip 4 is pressed to the state where the leg part 24 of the pin is inserted through the through-holes 7*a*, 8*a*. At that time, the clip is positioned so that the side walls 16 of the leg part are located at the rectangular corner portions of the through-hole 8*a*. When pressed, as described above, a pair of claw portions 29 is abutted against the opposing side portions of the rectangular hole of the through-hole 8*a*. However, when the clip 4 (pin 2) is strongly pushed, the claw 29*b* constituting the claw portion 29 contracts in diameter with the base portion 29*a* as a fulcrum, and passes through the through-hole 8*a*.

When the claw 29*b* completely passes through the through-hole 8*a*, the claw portion 29 elastically restores to its original state and temporarily fixes the clip 4 to the one member 7, thereby preventing inadvertent disengagement. FIG. 2 shows the temporary fixation state. In this temporary fixation state, the side walls 26 are swingably disposed at the corresponding corner portions of the rectangular hole of the through-hole 8*a* as shown in FIG. 2C, and the narrow portion 18 of each piece 16 protrudes from the through-hole 7*a* to the upper surface of the one member 7.

(B) When the clip 4 is operated from the above temporary fixation state by being pivoted (pivoted by θ=45 degrees in this example) from a solid line position to a dashed line position in FIG. 2A by using the knob part 22, the one member 7 is attached to the other member 8, and thus, the main fixation state of FIG. 3 is achieved. In this structure, the pivoting operation causes the side walls 26 to be pivoted from the corner portions to the opposing sides of the rectangular hole of the through-hole 8*a* as shown in FIG. 3C. Simultaneously, each piece 16 moves to the rectangular corner portion while the narrow portion 18 enters the hole of the through-hole 8*a*. Simultaneously, each inclined portion 26*b* passes through the through-hole while being pressed against the inner surface of the through-hole 8*a* and clamps the hole edge or hole periphery of the through-hole 8*a* between the lower end surface of the upper wall 25 and the uppermost portion of the inclined portion 26*b*. Naturally, the uppermost portion of the inclined portion 26*b* is engaged with the back side of the other member 8.

In the above main fixation state, the narrow portion 18 on the leading end side of each piece 16 fills a gap at the rectangular corner portion of the through-hole 8*a*, so that rattling or the like is eliminated and a stable fixation state can be obtained. Further, the inclined portion 26*b* can function as a screwing action to reduce the pivoting resistance during the pivoting operation, or it can be seen by the click feeling that the hole edge of the through-hole 8 is completely clamped or engaged between the lower end surface of the upper wall 25 and the uppermost portion of the inclined portion 26*b*. In the main fixation state, good watertightness is maintained because the suction part 15, i.e., the seal surface 15*a* of the suction part is formed by the two-sided split mold structure without putting a parting line therein. In addition, the watertightness from the side of the leg part 24 can be reliably secured by the packing 3, as a watertight structure, disposed between the head part 10 of the grommet 1 and the head part 20 of the pin 2. Further, it is possible to easily absorb the variations in the plate thickness dimension or the like while properly setting the degree of the pressure contact of the suction part and the degree of the engagement of the leg part by the collapse of the packing 3. Meanwhile, the clip 4 is pivoted to the position in FIG. 2, and then, is forcibly pulled out with the elastic displacement of the claw portion 29.

(C) FIG. 4 shows an action of absorbing the variations in the plate thickness dimension by the packing 3. That is, in this example, the thickness M of one member 7*a* is slightly thicker than that of the one member 7. Even in this case, the above clip 4 is also excellent in that the variations in the plate thickness dimension can be absorbed by the degree of the collapse of the packing 3 without compromising the sealing property of the seal surface 15*a* and impairing the clamping or engaging strength of the leg part 24.

First Modification

Figure 9:
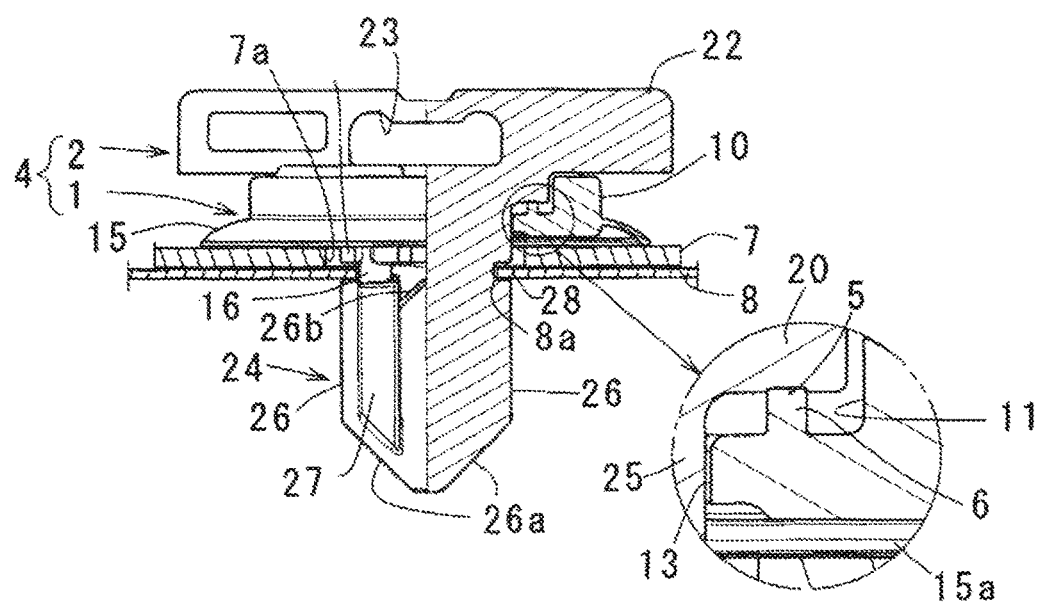
FIG. 9 is a half sectional view corresponding to FIG. 4B, showing an example in which a packing in FIGS. 2 and 3 is replaced with an elastic wall portion.

The above clip 4 can be modified as shown in FIG. 9. That is, as shown in FIG. 9A, this modification adopts a watertight structure that is made of an elastic wall portion 6 protruding from the inner bottom surface of the recessed portion 11 of the head part 10 on the grommet side and a groove portion 5 provided on the lower surface of the head part 20 on the pin side and receiving the elastic wall portion 6, instead of the watertight structure using the packing 3. The elastic wall portion 6 protrudes in an annular form around the insertion hole 13. The groove portion 5 is an annular groove centering on the head part 20 and locks the leading end of the elastic wall portion 6.

Also in the above first modification, the watertightness from the side of the through-hole 8a and the leg part 24 can be secured by the water-blocking action of the elastic wall portion 6. At the same time, it is possible to easily absorb, for example, the variations in the plate thickness dimension or the like of the one member 7 while properly setting the degree of the pressure contact of the suction part 15 and the degree of the engagement of the leg part 24 by the elastic displacement of the elastic wall portion 6. Meanwhile, the elastic wall portion 6 may be provided in the head part 20 on the pin side, instead of the recessed portion 11. In this case, the above groove portion is preferably formed in the recessed portion 11. However, as a watertight structure, it is also acceptable that the groove portion is omitted and the elastic wall portion is in contact with the corresponding surface on the other side.

Second Modification

Figure 10A:
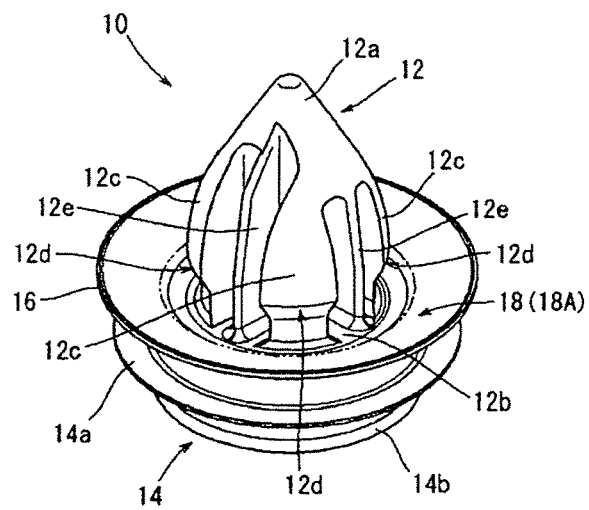
FIGS. 10A and 10B show a structure disclosed in Patent Document 1.
Figure 10B:
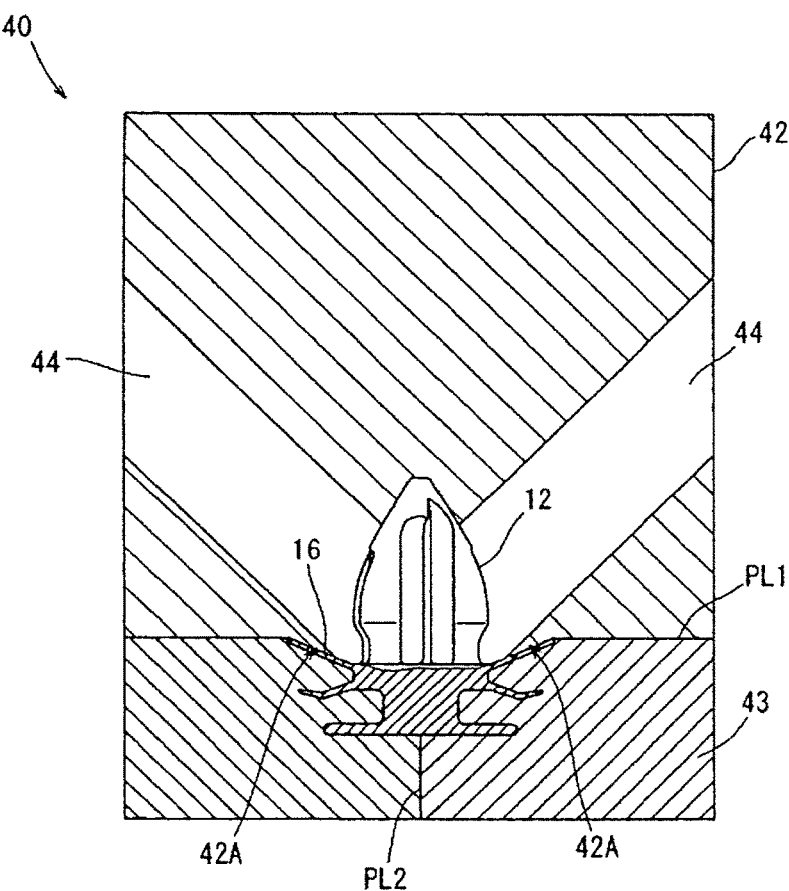

In the embodiment and the first modification, an example where the above clip 4 is a turn fastener type has been described. In the turn fastener type, the leg part 24 of the pin 2 that is the first member is shaped to have a direction in which it can be inserted into the non-circular hole as the through-hole 8a and a direction in which it cannot be inserted into the non-circular hole, and the detachment of the clip is prevented by being pivoted in a state where the leg part is inserted into the through-hole 8a. However, the clip is not limited to this type but may be applied to a non-pivoting fastener type shown in FIG. 10. That is, as the leg part 24 of the above (1) to (3), it is only necessary to satisfy the configuration that the leg part is provided vertically from the head part 20, the configuration that the leg part is inserted into the insertion hole 13 of the grommet 1 that is the second member, and the configuration that the leg part is inserted into the through-hole 8a of the other member and engages with the back side of the other member. Therefore, by adopting the same configuration as the anchor 12 in FIG. 10, the configuration of the leg part 24 of the pin can be changed in such a way that it passes through the through-hole 8a while contracting in diameter, and simultaneously with the passing, the diameter thereof is expanded to its original shape.

As described above, the clip of the present invention may have the configuration specified in each claim, and details thereof can be further modified or expanded with reference to this form and each modification. As an example, the pin can be simplified by omitting the temporary fixing claw portion of the leg part, or the wide portion and the narrow portion constituting the engaging piece can be simplified into the piece shape of the same width.

This application is based on Japanese Patent Application (Patent Application No. 2015-051555) filed on Mar. 16, 2015, the contents of which are incorporated herein by reference.

REFERENCE NUMERALS LIST

1: Grommet (First Member), 2: Pin (Second Member), 3: Packing (Watertight Structure), 4: Clip, 5: Receiving Surface of Opposing Surface (Watertight Structure), 6: Elastic Wall Portion (Watertight Structure), 7: One Member (7a is a through-hole), 8: The other Member (8a is a through-hole), 9: Mold for Grommet, 10: Head. Part (11 is a recessed portion, 12 is a convex portion), 13: Insertion Hole (13a is a corner hole portion), 15: Suction Part (15a is a seal surface), 16: Piece Portion (17 is a wide portion, 18 is a narrow portion), 20: Head part (21 is a concave portion), 22: Knob Part, 24: Leg Part, 25: Upper Wall, 26: Side Wall (26b is an inclined portion), 27: Corner Space, 28: Lateral Groove (28a is a flange portion), 29: Temporary Fixing Claw Portion

What is claimed is:

1. A clip used for removably attaching or restraining one member with respect to another member, through-holes being formed in the one member and the another member, the clip comprising:
   a first member that includes:
      a first head part configured to be disposed to close the through-hole of the one member;
      a suction part protruding around the first head part; and
      an axial insertion hole formed through the first head part in an axial direction of the first head part; and
   a second member that includes:
      a second head part which overlaps with the first head part of the first member and forms a watertight structure with the first head part of the first member; and
      a leg part vertically provided from the second head part and being configured to be inserted into the insertion hole and the through holes of the one member and the another member to be engaged with the another member,
   wherein the leg part has a shape in which the leg part can be inserted into non-circular holes which are the through-holes while the leg part is directed in one direction with respect to the through holes and the leg part cannot be inserted into the non-circular holes while the leg part is directed in another orientation with respect to the through holes, and the leg part includes a plurality of side walls which are pressed against hole edges or hole walls of the through-holes when the clip is pivoted in a state in which the leg part is inserted into the through-holes, and
   the first member has a plurality of pieces which are provided on its back surface, each having a wide portion on a base end side and a narrow portion on a leading end side, and the narrow portion is brought into contact with a corresponding portion of the through-holes at a time of main fixing after pivoting.

2. The clip according to claim 1, wherein the watertight structure includes a packing disposed between the first head part and the second head part.

3. The clip according to claim 1, wherein the watertight structure includes an annular elastic wall portion which is provided in one of the first member and the second member and is abutted against an opposing surface of another of the first member and the second member.

4. The clip according to claim 1, wherein the side walls are separated from upper walls by lateral grooves, each side wall having an inclined portion which is formed in a thickness direction and facing an end surface of the upper wall with each of the lateral grooves interposed therebetween, and hole edge sides of the through-holes are clamped between uppermost portions of the side walls and end surfaces of the upper walls when the leg part is pivoted in a state of being inserted into the through-holes.

5. The clip according to claim 1, wherein the leg part has a temporary fixing claw portion which contracts in diameter when inserted into the through-holes and elastically restores after the passing through the through-holes to be engaged with the hole edges of the through-holes.

\* \* \* \* \*